United States Patent
Partsch

[11] 3,875,729
[45] Apr. 8, 1975

[54] GRASS CLIPPER GUIDE ATTACHMENT FOR REEL-TYPE MOWERS

[76] Inventor: Timothy J. Partsch, 570 22 1/2 Rd., Grand Junction, Colo. 81501

[22] Filed: Dec. 19, 1973

[21] Appl. No.: 426,051

[52] U.S. Cl................................. 56/199; 56/192
[51] Int. Cl............................................. A01d 53/06
[58] Field of Search............. 56/192, 193, 194–206, 56/249, 249.5–254

[56] References Cited
UNITED STATES PATENTS

| 1,029,527 | 6/1912 | Bonham | 56/199 |
| 1,484,084 | 2/1924 | Rohrbach | 56/199 |
| 2,440,934 | 5/1948 | DeVol | 56/199 |
| 2,570,541 | 10/1951 | Gabrielson | 56/1 |

*Primary Examiner*—Russell R. Kinsey

[57] ABSTRACT

A grass clipping guide attachment is interposed between the blades of a reel-type lawnmower and a rearwardly trailing grass catcher to position guide vanes at a lateral angle opposing the angle of flow of severed grass from the reel mower blades so as to divert the grass clippings rearwardly into the catcher.

8 Claims, 4 Drawing Figures

PATENTED APR 8 1975 3,875,729
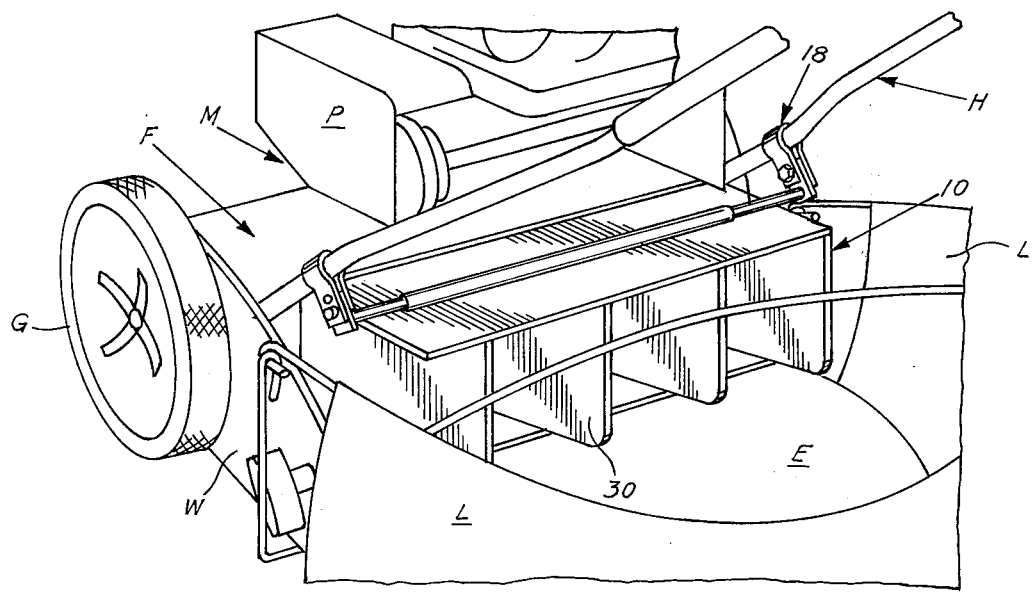
FIG. 1
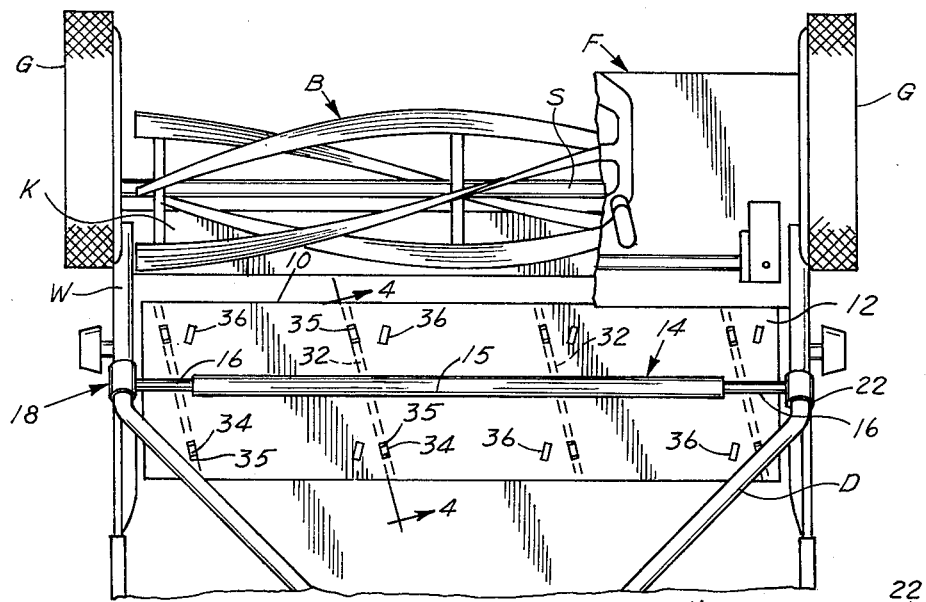
FIG. 2
FIG. 3
FIG. 4

GRASS CLIPPER GUIDE ATTACHMENT FOR REEL-TYPE MOWERS

This invention generally relates to new and useful improvements in grass clipping guide attachments for lawnmowers and more particularly relates to a novel and improved guid for directing severed particles of grass thrown rearwardly by the spiral blades of a reel type lawnmower into the grass catcher.

In the past, various types of grass catcher attachments have been devised for lawnmowers to collect the grass as it is severed by the mower blades and thrown rearwardly from the mower. Both in the case of rotary and reel-type lawnmowers, particularly of the power type, the severed grass tends to be widely scattered as it is thrown rearwardly by the mower blades. As a result, various means have been devised to more efficiently collect the grass. However, this has resulted for the most part in relatively complicated and bulky grass-catching equipment which is difficult to handle, highly expensive and has not been found to be very practical in actual use. As a result, present day lawnmower grass-catchers have not departed substantially from the basic types constructed and arranged as early as the turn of the century. Typical of those early types are those illustrated and disclosed in the patents to Crosier U.S. Pat. No. 383,632, Deland U.S. Pat. No. 406,433 and Bonham U.S. Pat. No. 1,029,527.

Reel-type lawnmowers have posed a particular problem in terms off efficiently collecting the severed grass in that the spiral blades tend to throw the grass at a lateral angle away from the path of travel of the mower. This angle may be to either side of the lawnmower depending upon the direction of spiral so that not only does a considerable portion of the severed grass fly outside of the grass catcher to one side or the other; but also that portion of the grass which passes into the grass catcher tends to collect in one side and is not evenly distributed across the width of the catcher. Accord- to manufacture and install and which is comprised of a minimum number of parts.

It is a further object of the present invention to provide for a grass clipping guide attachment which is conformable for use with different sizes and types of lawnmowers, both hand and power operated, and which is capable of attachment to the mower without modifying the mower or catcher assembly.

It is a still further object of the present invention to provide for a novel and improved grass clipping guide attachment which can be interposed between the mower blades of a reel-type lawnmower and a rearwardly trailing grass catcher to efficiently guide and divert severed grass particles thrown rearwardly at a lateral angle from the mower and to evenly distribute the clippings across the entire width of the rearwardly trailing grass catcher.

In accordance with the present invention, a grass clipping attachment has been devised which is specifically adaptable for use with a reel-type lawnmower in which the spiral blades of the mower in the process of cutting will tend to throw the grass rearwardly at a lateral angle to the longitudinal path of travel of the mower. The preferred form of guide attachment of the present invention is characterized by a mounting plate adapted for attachment to the mower handle directly behind the blade, and a series of upstanding guide vanes are suspended from the mounting plate for rearward extension at a lateral angle to the path of travel of the lawnmower substantially equal and opposite to the angle of the medial line of flow of the severed grass particles rearwardly from the mower. The guide vanes can be adjustably mounted on the mounting plate to counter or intercept the lateral flow of clippings and are arranged at uniformly spaced intervals substantially from end to end of the mower blades so as to divert the grass clippings into a path substantially parallel to the line of travel of the mower and to cause the clippings to be evenly distributed and collected in the grass nated M and in front of a conventional grass catcher C. The mower M is merely representative of various types of commercially available power mowers now on the market and intended for residential use, the one shown being one of the eighteen inch Jacobsen reel-type power mower, Model No. 11801 or No. 11825, manufactured by Jacobsen Manufacturing Company. The mower is broadly comprised of reel type or spiral cutter blades B mounted for rotation about a central drive shaft S which is journaled for rotation on a wheel frame F, and a motive power source P is mounted upon the frame for driving the cutter blades B either through a suitable gear train or power transmission belt assembly. Rearwardly extending side walls W on opposite ends of the frame support a stationary knife bar K beneath the cutter blades B and also support a roller R just rearwardly of the knife bar, all in a conventional manner. A handle H includes bifurcated or forked end portions D at the forward end which are mounted on the wheeled frame just inwardly of the outer ground-engaging wheels G of the mower. Suitable hand-operated controls, not shown, extend forwardly from the end of the handle H to regulate the clutch and engine for the mower assembly. Again, the mower is described as merely representative of various types of commercially available mowers; and it is emphasized that the guide attachment of the present invention is readily conformable for different sizes and models of reel-type mowers, whether hand or power operated.

The grass catcher C is also of conventional construction and may typically consist of a bottom E suitably composed of sheet metal with a reinforcing rod J extending across the front edge, and an upstanding side wall L suitably composed of a fabric material curves rearwardly around the outer peripheral edge of the bottom E and includes an upper wire frame Y with front terminal hooked end portions T for attachment of the catcher to the side walls W. The catcher either may be of the selfsupporting type in which a wire frame is incorporated into the side walls L or may be of the type having a hook-shaped rod, not shown, at the rearward extremity of the side wall for suspension of the catcher from the handle.

The preferred form of guide attachment 10 is comprised of an upper support plate 12 which is dimensioned to extend the greater width of the mower substantially corresponding to the length of the reel cutter B. The support plate 12 is of oblong generally rectangular configuration, and an elongated telescoping support rod assembly 14 is affixed to the upper surface of the support plate 12 for extension centrally of the length of the support plate. The support rod assembly includes an elongated sleeve 15 with telescoping support rods 16 slidably inserted into opposite sides of the sleeve 15. Each support rod 16 includes an end connector assembly 18 at its outer terminal end, each end connector 18 correspondingly comprised of an upstanding bracket or flange 19 provided with an opening 20 therethrough for insertion of a bolt or other suitable fastener 21. A flexible strap 22 is bent into generally U-shaped configuration and has lower free end portions 23 provided with bolt-receiving openings 24 which may be aligned with the opening 20 in the bracket to affix the free ends of the strap to the bracket and to form a closed loop which is passed around the forward bifurcated end portions D of the handle H. It will be noted that the free ends of the loop are provided with additional openings 24, in order to vary the effective length of the loop and the spacing of the entire guide attachment 10 beneath the handle, so that the guide attachment is readily conformable for attachment to different sizes of mowers. The telescoping support rods 16 are easily adjusted and readily slidable through the sleeve 15 to vary the effective length of the guide attachment to comform to the width of the mower. For example, the effective length can be varied over an appreciable distance to conform to different standard widths of mowers.

A plurality of guide vanes 30 depend downwardly from the support plate 12 at equally spaced intervals along the entire length of the plate. Each of the guide plates is of generally rectangular configuration and is sized to extend downwardly from the support plate for a distance corresponding to the opening area between the knifebar K and upper support portion of the wheeled frame F for the motive power source P behind the mower blades B so as to traverse substantially the entire rear opening through which the grass is thrown by the mower blades toward the grass catcher C. In order to attach the guide vanes 30 to the support plate 12, most desirably the guide vanes each include an upper edge 32 with spaced upwardly projecting lock tabs 34 which are inserted through pairs of aligned slots 35 in the support plate. As best seen from FIG. 4, an additional pair of aligned slots 36 is provided adjacent to the pairs of slots 35 for each guide vane to reverse the angle of the guide vane in a manner now to be described.

The angle of each pair of slots 35 in the support plate 12 is such that the guide vanes will be mounted at a lateral angle with respect to the line or path of travel of the mower which angle is substantially equal and opposite to the lateral path of flow of the grass clippings thrown rearwardly by the mower blades B. As discussed, the spiral blades B in traversing the knife bar and severing the grass will, by virtue of the angle formed with the knife bar, tend to throw the grass along a path of travel away from the medial line of travel of the mower itself. Again, the guide vanes are arranged to be equal and opposite to that angle so as to divert the flow of the grass clippings and cause them to assume a more nearly rearward direction of travel directly into the grass catcher. In that the guide attachment is mounted directly behind the mower blades B, the guide vanes will intercept the flow of grass clippings immediately behind the mower blade and in reversing their travel will cause the clippings to accumulate more evenly across the entire width of the catcher. The upper mounting or support plate 12 will cooperate in diverting any particles that are thrown upwardly by the mower blades and cause them to pass more directly into the grass catcher.

In use, most desirably the guide attachment is mounted such that the guide vanes extend uniformly across the width of the mower blades. Of course, when the guide attachment is to be attached to different width mowers it is most essential that the outermost guide vane on the attachment nearest to the side of the mower through which the grass clippings are normally thrown at a lateral or sidewards angle remain as close to the side wall as possible. In general, therefore, the guide vane along the side of the mower through which the grass clippings will tend to be discharged are most important in diverting the flow of the grass in a direction more nearly along the line of travel of the mower.

The oppositely disposed slots 36 will permit reversible or adjustable mounting of the guide vanes in the event that the guide attachment is to be used on a mower in which the direction of spiral of the blades B is reversed; i.e., will tend to discharge the grass laterally away from the righthand side of the mower instead of the left-hand side, as viewed in FIG. 2. Since the lock tabs 34 are merely pressfit into the slots 35, the vanes 30 can be positively released from the slots 35 and reversed in mounting by insertion into the slots 36 so that once again the angular disposition of the vanes is counter to the flow of grass. Of course, if desired, the lock tabs can be permanently fastened into their slots by means of a suitable adhesive or bonding agent.

The guide attachment as described may be manufactured of inexpensive, lightweight materials, such as, many of the durable lightweight semi-rigid or rigid plastics presently on the market. Notwithstanding differences in sizes of different mowers, the openings 24 in the loops 22 permit variation in spacing of the guide attachment beneath the handle so that the guide vanes 30 will rest either above or on the front end of the catcher and the rearward end of the knife bar.

Although the present invention has been described with a certain degree of particularity, it is to be understood that changes in details of structure may be made without departing from the spirit thereof, as defined by the appended claims.

What is claimed is:

1. A grass clipping guide attachment adapted for use with reel-type lawnmowers wherein the grass cut by the mower blades is directed rearwardly at a lateral angle to the direction of travel of the lawnmower, said guide attachment comprising a mounting plate adapted for attachment to the lawnmower behind the mower blades, and a series of upstanding guide vanes supported by said mounting plate rearwardly of said mower blades and at spaced intervals substantially across the width of said lawnmower, said guide vanes extending rearwardly at a acute angle to the path of travel of the lawnmower which angle is substantially equal and opposite to the angle of the medial line of flow of the grass clippings rearwardly from the mower blades.

2. A grass clipping guide attachment according to claim 1, said mounting plate extending across said lawnmower rearwardly and above the center axis of the reel, and said guide vanes depending downwardly from said mounting plate.

3. A grass clipping guide attachment according to claim 2, further including means adjustably mounting said guide attachment substantially parallel to the center rotational axis of said reel.

4. A grass clipping guide attachment according to claim 1, said guide vanes being releasable mounted in slots in said mounting plate.

5. A grass clipping guide attachment according to claim 4, said mounting plate including means for reversably mounting said guide vanes according to the lateral direction of flow to the grass clippings rearwardly away from said lawnmower.

6. A grass clipping guide attachment according to claim 3, said mounting means including an elongated telescoping members affixed to the upper surface of said mounting plate, said telescoping members including end connectors for releasable attachment to opposite sides of the handle of said lawnmower.

7. A grass clipping guide attachment according to claim 1, in which said lawnmower is provided with a knife bar and roller assembly rearwardly of and below said reel blades, and said guide vanes depending downwardly from said mounting plate for a distance to rest above said knife bar.

8. A grass clipping guide attachment according to claim 1, said mounting plate being of oblong, generally rectangular configuration, and each of said guide vanes being of generally rectangular configuration and provided with lock tabs on their upper surfaces for releasable insertion in slots provided in said mounting plate.

* * * * *